United States Patent
Powell (10) Patent No.: US 9,430,561 B2
(45) Date of Patent: Aug. 30, 2016

(54) FORMATION OF TOPIC PROFILES FOR PREDICTION OF TOPIC INTEREST GROUPS

(71) Applicant: Facebook, Inc., Menlo Park, CA (US)

(72) Inventor: Spencer Powell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 235 days.

(21) Appl. No.: 13/720,756

(22) Filed: Dec. 19, 2012

(65) Prior Publication Data

US 2014/0172857 A1    Jun. 19, 2014

(51) Int. Cl.
*G06F 17/30* (2006.01)

(52) U.S. Cl.
CPC ..... *G06F 17/30702* (2013.01); *G06F 17/3071* (2013.01); *G06F 17/30705* (2013.01)

(58) Field of Classification Search
CPC ............ G06F 17/30616; G06F 17/3071; G06F 17/30702; G06F 17/30705
USPC ....................................................... 707/738
See application file for complete search history.

(56) References Cited

U.S. PATENT DOCUMENTS

| | | | |
|---|---|---|---|
| 7,146,416 B1 * | 12/2006 | Yoo et al. | 709/224 |
| 7,287,064 B1 * | 10/2007 | Haldar et al. | 709/217 |
| 8,166,026 B1 * | 4/2012 | Sadler | 707/725 |
| 8,510,285 B1 * | 8/2013 | Stekkelpak | 707/706 |
| 2007/0067317 A1 * | 3/2007 | Stevenson | 707/100 |
| 2012/0005224 A1 * | 1/2012 | Ahrens et al. | 707/769 |
| 2012/0047148 A1 * | 2/2012 | Guo et al. | 707/748 |
| 2012/0159403 A1 * | 6/2012 | Capan | 715/863 |

* cited by examiner

*Primary Examiner* — Rehana Perveen
*Assistant Examiner* — Hicham Skhoun
(74) *Attorney, Agent, or Firm* — Fenwick & West LLP (57) ABSTRACT

An analysis system analyzes known user affinities to identify particular objects that serve as useful predictors of whether a given user will have an affinity for a given topic, even if the user has not previously expressly specified an affinity for that topic. Specifically, both the topic group of users associated with a given topic and the category group of users associated with the topic's more general category are identified. For each of a set of objects, degrees of divergence between the topic group and the category group are evaluated for a criterion evaluated with respect to the object. A topic profile is created based on objects for which there is a high degree of divergence.

20 Claims, 3 Drawing Sheets

FIG. 1

| Object | Topic | Category | Divergence |
|---|---|---|---|
| $O_1$ | 5% | 1% | 5 |
| $O_2$ | 0.2% | 2% | -10 |
| $O_3$ | 2% | 2.5% | -1.25 |
| ... | ... | | |
| $O_N$ | 3% | 2% | 1.5 |

FIG. 2A

| Object | Divergence |
|---|---|
| $O_1$ | 5 |
| $O_2$ | -10 |
| $O_{16}$ | 4.5 |
| $O_{22}$ | 6.2 |

| Object | Criterion satisfied? |
|---|---|
| $O_1$ | 1 |
| $O_2$ | 0 |
| $O_{16}$ | 1 |
| $O_{22}$ | 0 |

FORMATION OF TOPIC PROFILES FOR PREDICTION OF TOPIC INTEREST GROUPS

BACKGROUND

The present invention generally relates to the field of computer data storage and retrieval, and more specifically, to identifying groups of users that are likely to be interested in particular topics.

Many organizations have information to convey electronically, such as invitations to join a particular group, product or service advertising information, and the like, and they would like to selectively provide the information to the users most likely to be interested in the information. More generally, it is valuable in many contexts to be able to determine the interests of particular users of electronic systems.

In some cases, users expressly specify that they have interest in (or, "have an affinity for") a particular topic. For example, a user of a social networking system might specify approval for (e.g., "Like") the webpage associated with a general topic such as "Automobiles," or with a specific topic such as a particular car model (e.g., "NISSAN LEAF"). However, in many or most cases users only expressly specify their affinities for a small subset of the topics in which they are interested. Thus, for any given topic only a—possibly small—percentage of the users are likely to have expressly specified an interest in the topic, making it difficult for organizations to accurately identify the target audience for a given topic.

SUMMARY

Embodiments of the invention analyze known user affinities to identify particular data objects that serve as useful predictors of whether a given user will have an affinity for a given topic, even if the user has not previously expressly specified an affinity for that topic.

Specifically, an analysis system, such as a social networking system, stores or otherwise has access to information on a set of topics, such as particular car models, sports, political figures, television programs, movies, or any other concepts in which a user might have an interest. For each topic, the analysis system also identifies a corresponding more general category that includes the topic and other related topics. Further, for each topic the analysis system stores or otherwise has access to information about which users have expressly specified an affinity for the topic.

The analysis system then identifies objects, such as web pages associated with particular topics, that serve as useful predictors of whether a given user will have an affinity for a given topic. Specifically, the analysis system identifies both the users associated with the given topic (e.g., the users that have expressly specified an interest in the topic)—hereinafter referred to as the "topic group"—and the users associated with the topic's more general category (e.g., the users that have expressly specified an interest in any topic within the category)—hereinafter referred to as the "category group." For each of the objects, the analysis system evaluates degrees of divergence between the topic group and the category group for a criterion evaluated with respect to the object. The objects for which there is a particularly large degree of divergence between the criterion as evaluated for the topic group and for the category group represent objects that serve as good predictors of whether a given user will have an affinity for the topic. That is, identifying objects with a particularly large degree of divergence serves to emphasize the qualities specific to topic, rather than the general qualities shared by all topics in the more general category. Accordingly, the analysis system creates a topic profile for the topic that includes information on the divergent objects. The topic profile can then be applied to information known about a given user to predict whether that user is likely to have an affinity for the topic.

As a more concrete example, in one embodiment the analysis system is a social networking system. The social networking system stores a set of pages (the "objects" described above) that are representative of a wide variety of distinct topics. For a given topic, the social networking system identifies, for each page, a degree of divergence between the affinities expressed for the page by the topic group (e.g., whether the topic users "Liked" the page, the "criterion" described above) and those expressed by the category group. Thus, for example, for the topic "NISSAN LEAF" representing an environmentally-friendly electric car, the social networking system might discover that pages devoted to certain environmentalist politicians or to television shows with a particular political viewpoint lead to a high degree of divergence among the affinities expressed for the pages by the topic group and by the more general category group. Accordingly, the social networking system creates a topic profile that focuses on these divergent pages. The emphasis on divergences between the topic group and the category group serves to focus on the qualities that attract people to the NISSAN LEAF, specifically (e.g., environmental concerns), rather than allowing information on such qualities to be drowned out by information on the qualities that attract people to cars in general. The topic profile can then be applied to the information known about a particular user who has not expressly specified an affinity for the NISSAN LEAF—e.g., the politicians or television shows that the user favors—to predict whether the user would, in fact, have an affinity for it.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
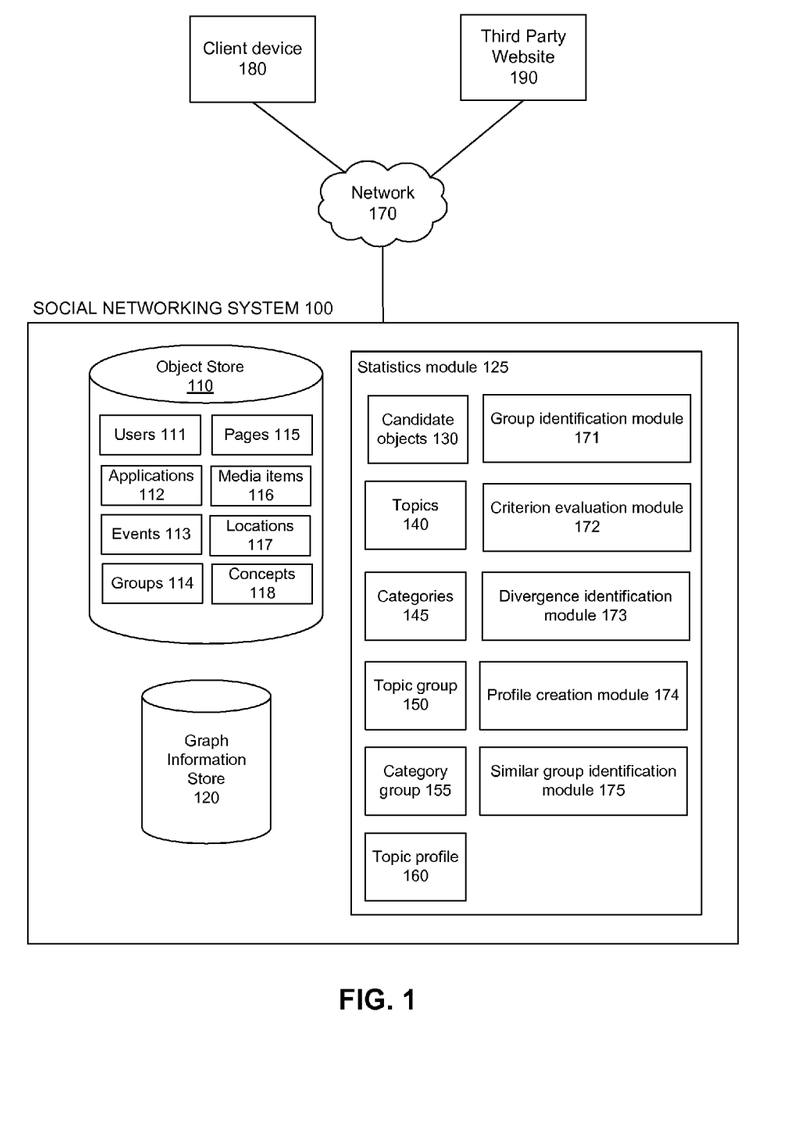
FIG. 1 is a high-level block diagram of a computing environment, according to one embodiment.

FIG. 1 is a high-level block diagram of a computing environment according to one embodiment. FIG. 1 illustrates a social networking system 100, a client device 180, and a third party website 190 connected by a network 170. A user of the client device 180 interacts with the social networking system 100 via an application such as a web browser, performing operations such as browsing content, posting messages, performing queries for people or other content of interest, and the like. The user can also use the client device 180 to interact with the third party website 190. Additionally, the third party website 190 can also interact with the social networking system 100 to obtain or to display data of the social networking system, either directly or indirectly.

The social networking system 100 comprises an object store 110 that stores information on various objects tracked by the social networking system 100. These objects may represent a variety of things with which a user may interact in the social networking system 100, including, without limitation, other users 111 of the social networking system (represented, e.g., as a profile object for the user), applications 112 (e.g., a game playable within the social networking system), events 113 (e.g., a concert that users may attend), groups 114 to which users may belong (e.g., a group devoted to alternative energy research), pages 115 (e.g., pages constituting a particular person or organization's presence on the system, such as pages about particular politicians, car models, or TV shows), items of media 116 (e.g., pictures, videos, audio, text, or any other type of media content), locations 117 associated with a user (e.g., "San Jose, Calif., USA"), and concepts 118 or other terms (e.g., an object corresponding to the concept "alternative energy"). The object store 110 may further store objects representing other data routinely produced by users of the social networking system 100, such as inbox messages, status updates, comments, notes, and postings. An object in the object store 110 may represent an entity existing within the social networking system (e.g., an application 112 available on the social networking system), a virtual entity that exists outside the domain of the social networking system (e.g., a website), or a real-world entity (e.g., a person, a product, or a show).

The object store 110 may store all of the objects existing within the social networking system 100, such as the code of an application 112, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Al Gore" for a person or page 115, or "Green Energy Group" for a group 114), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Al" and "Gore") for a user object 111.

In one embodiment the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects 111 representing that the users have a relationship in the social networking system (e.g., are friends, or have communicated, viewed the other's profile, or interacted in some way), an edge between a user object 111 and an application object 112 representing that the user has used the application, and an edge between a user object 111 and a group object 114 representing that the user belongs to the group, and an edge between a user object 111 and a page object 115 representing that the user has viewed the page or expressly specified an affinity for the page (e.g., "Liked" the page).

For example, if one user 111 establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" as the label between two user objects), and/or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

The social networking system 100 further comprises a statistics module 125 that forms profiles for topics of interest, the profiles indicating a set of objects for which there are significant divergences between the topic group in the category group with respect to a given criterion.

Specifically, the statistics module 125 comprises a set of topics 140, each topic representing a concept such as a particular car model, a sport, a political figure, or the like, for which a given user 111 might have an affinity. In one embodiment, the topics 140 are a subset of the concepts 118 stored in the object store 110. In other embodiments, the topics 140 may diverge from the concepts 118.

The statistics module 125 further comprises a set of categories 145 that encompass various ones of the topics 140, each topic having one or more associated categories. For example, given the topic "NISSAN LEAF" representing a particular model of car, the associated category might be "Automobiles," which includes not only the topic "NISSAN LEAF," but also other related topics, such as "TOYOTA PRIUS," "TOYOTA CAMRY," "FORD ESCORT," and the like. Thus, a given topic 140 is a member of its associated category 145 and hence has a certain degree of relationship with it, although the topic may have special qualities not shared by its category that cause it to appeal to a slightly different audience.

The statistics module 125 further comprises a group identification module 171 that identifies, for each topic 140, a topic group 150 of users 111 that have an affinity for the topic, and for each category 145, a category group 155 of users that have an affinity for the category. In one embodiment, a user 111 is said to have an affinity for a topic if the user has expressed at least some minimum degree of interest in the topic. A user may express an affinity for a topic in different ways, such as by "Liking" one or more pages 115 corresponding to the topic, by sharing the pages, by commenting on the pages, or by other actions with respect to the pages (or other non-page objects associated with the topic) that indicate that the user has some interest in the topic. Similarly, the user is said to have an affinity for a category if the user has expressed at least some minimum degree of interest in the topics within that category, such as by "Liking" some minimum number of pages (e.g., one page) corresponding to those topics. Thus, referring to the above example, a user 111 might be said to have an affinity for the category "Automobiles" if the user "Liked" a page 115 dedicated to the "NISSAN LEAF" car. As an alternative example, the user might be said to have an affinity for the category only if the user has "Liked" three or more web pages corresponding to the various car model topics within the category.

The statistics module 125 further comprises a set of candidate objects 130 that represent different concepts about which the members of the topic group 150 and the category group 155 can have differing opinions. Candidate objects 130 for which there is a particularly divided opinion between the topic group 150 and the category group 155 are used to form a topic profile 160, discussed later, which can be used to predict an affinity of a given user for a topic 140 to which the profile corresponds.

In one embodiment, the candidate objects 130 are a set of representative pages 115 from the object store 110. For example, in one specific embodiment there are 6,000 pages 115 corresponding to a broad, representative set of the topics 140, such as a page devoted to the NISSAN LEAF, to a particular politician, to a particular television show, or the like. The pages may be manually selected by employees of the organization responsible for the social networking system 100 from a much larger universe of all the pages 115 in the object store 110 e.g., hundreds of thousands or millions of pages. Alternatively, the representative pages may be automatically identified, such as by identifying a topic for each page 115 accessed by users 111, identifying the 6,000 most frequent topics of the aggregate page accesses, and selecting the most frequently accessed page for each of those topics.

The statistics module 125 further comprises a criterion evaluation module 172 that determines, for a given user 111 and for a given candidate object 130, whether the user and the object satisfy a given criterion, i.e., whether C(u, o) is true for some criterion C, user u, and object o. The criterion may differ in different embodiments. In one embodiment, the objects are pages 115, and the criterion is whether or not the user has expressed an affinity for (e.g., "Liked"), the page. In another embodiment, the objects are groups 114, and the criterion is whether the user is a member of the group. In other embodiments, the criterion includes whether connections of the user (e.g., the user's friends) have a particular relationship with the object, such as "Liking" a page object or being a member of a group object. One of skill in the art would appreciate that many such criteria are possible, and may be composite criteria, such as a boolean expression involving a number of sub-criteria, such as whether both the user and some minimum number of the user's friends have expressed an affinity for the object.

The statistics module 125 further comprises a divergence identification module 173 that identifies the candidate objects 130 for which there is the largest divergence between interest measures of the topic group 150 and the category group 155 with respect to the candidate object. In some embodiments, the measure of interest of a group is computed as a function of the number of users in the group for which the criterion is satisfied. In one such embodiment, the divergence identification module 173 uses the criterion evaluation module 172 to determine, for every candidate object 130, how many of the members of the topic group 150 and of the category group 155 satisfy the criterion with respect to the candidate object. Based on this determination, the divergence identification module 173 quantifies the degree of divergence between the topic group 150 in the category group 155 respect to that candidate object.

Figure 2A:
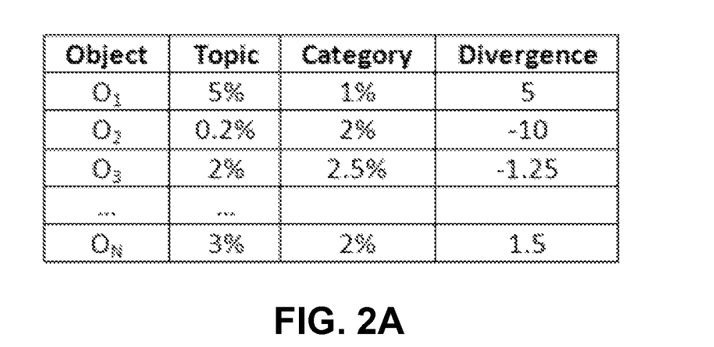
FIG. 2A illustrates sample data computed by a divergence identification module, according to one embodiment.

FIG. 2A illustrates sample data computed by the divergence identification module 173, according to one embodiment. More specifically, FIG. 2A represents some number N of candidate objects, $O_1$ to $O_N$. To make the example more concrete, assume that the each candidate object is a page 115, such as a page about the NISSAN LEAF or a particular politician, and that the criterion is whether a user has "Liked" that page. (As noted above, however, the particular types of candidate objects and criteria may differ in different embodiments.) For each page, the divergence identification module 173 computes the percentage of the topic group, and of the category group, that has "Liked" the page (referred to as the "topic rate" and "category rate," respectively), and computes a degree of divergence for the page as the ratio between the topic rate and the category rate. In one embodiment, if the topic rate is greater than the category rate, the degree of divergence is computed as (topic rate)/(category rate); if the topic rate is less than the category rate, then the degree of divergence is computed as −(category rate)/(topic rate) (i.e., a negative number). For example, for the first page ($O_1$), the criterion evaluation module 172 determined that 5% of the topic group 150 "Liked" the page, and that only 1% of the category group 155 "Liked" the page. Thus, the divergence identification module 173 computes a divergence measure of 5%/1%=5. Similarly, for the second page ($O_2$), the divergence identification module 173 determines that 0.2% of the topic group 150 "Liked" the page, whereas 2% of the category group 155 did so, for a divergence measure of −(2%/0.2%)=−10.

Returning again to FIG. 1, the statistics module 125 comprises a profile creation module 174 that creates topic profiles 160 based on the degrees of divergence computed by the divergence identification module 173. Specifically, the profile creation module 174 identifies the candidate objects 130 having the greatest degrees of divergence between the topic group 150 and the category group 155. The candidate objects 130 having the greatest degrees of divergence may be calculated in different ways in different embodiments. For example, in one embodiment, the average divergence is calculated by summing the degrees of divergence across all the candidate objects 130 and dividing by the number of candidate objects. The profile creation module 174 then selects the candidate objects 130 that are the furthest above or below the average divergence for inclusion in the topic profile 160. In one embodiment, the candidate objects selected for the topic profile 160 are stored in the user profile in association with their corresponding degrees of divergence. In one embodiment, the profile creation module 174 selects at most some fixed number of candidate objects 130 above and/or below the average divergence; in another embodiment, profile creation module 174 selects all candidate objects 130 more than a given number of standard deviations above or below the average divergence. One of skill in the art would appreciate that many other variations are also possible.

Referring to the example of FIG. 2A, assume that the average divergence for all N pages is 0.1, indicating that approximately the same percentage of users in the topic group 150 and in the category group 155 "Liked" the pages. Assume further that the divergence measure of 5 for the first page and of −10 for the second page are within the top M degrees of divergence away from the average of 0.1, and that the divergence measure of 0.84 for the third page is not within the top M degrees. Accordingly, the first and second page will be included in the topic profile 160 for the topic 140, but the third page will not.

In one embodiment, the statistics module 125 further comprises a similar group identification module 175 that applies the topic profile 160 for a topic 140 to identify users 111 with similarities to the users who did expressly state an affinity for the topic. Put another way, the similar group identification module 175 identifies users that likely have an affinity for the topic even though they have not expressly stated it. More specifically, for each user of some set of users, the similar group identification module 175 applies the topic profile 160 to information known about the user to determine a topic affinity score for the user.

Figure 2B:
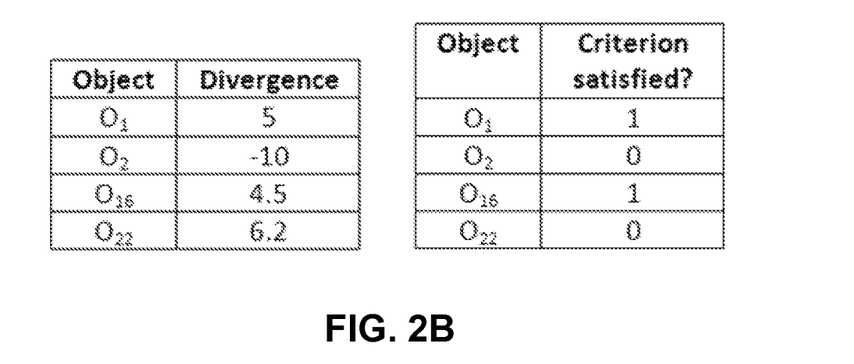
FIG. 2B illustrates sample data used in the computation of a topic affinity score.

In one embodiment, the topic affinity score for a user is computed as the sum of the products of the divergence score for an object in the topic profile 160 and the criterion satisfaction for the object and for each user, i.e. $A_u = \Sigma_o (D_u * S_u)$, where $A_u$ is the topic affinity score for user u, $D_u$ is the divergence measure for user u and object o, and the criterion satisfaction score $S_u$ is 1 if the criterion C(u, o) is true for user u and object o, and 0 otherwise. For example, referring to FIG. 2B, assume that the topic profile 160 for some topic 140 included objects $O_1$, $O_2$, $O_{16}$, and $O_{22}$ having topic-category divergence measures of 5, −10, 4.5, and 6.2, respectively. Further assume that, for a given user $U_1$, the criterion is satisfied (that is, $C(u_1, O_i)$ is true) for $O_1$ and $O_{16}$, but not for $O_2$ or $O_{22}$. The topic affinity score for user $U_1$ is then (5*1)+(−10*0)+(4.5*1)+(6.2*0)=9.5. The topic affinity score is positive (i.e., indicates that the user will have an affinity for the topic) because, for example, the criterion was satisfied with respect to $O_1$ and $O_{16}$, which both had positive divergence scores (indicating the likelihood of affinity for the topic), and was not satisfied with respect to $O_2$, which had a highly negative divergence score (indicating the likelihood of aversion to the topic).

With a topic affinity score determined for each of the users 111 (or some candidate subset thereof), the similar group identification module 175 identifies the users with topic affinity scores that indicate that the users would likely have an affinity for the topic. For example, using the above example technique to calculate the topic affinity score, in one embodiment the similar group identification module 175 normalizes the topic affinity score and identifies users with topic affinity scores above a given normalized minimum. In other embodiments, the similar group identification module 175 identifies users with topic affinity scores within the top N percent of users for that topic, such as the top 1% or the top 5%, for example.

The set of users identified by the similar group identification module 175 thus consists of users having at least some minimum degree of similarity to the users in the topic group 150 with respect to candidate objects 130 that are effective differentiators of those with an affinity for the particular topic from those who merely have an affinity for the more general category that includes the topic. Accordingly, the identified users have a high likelihood of having a genuine affinity for the particular topic 140. The social networking system 100, or other affiliated organizations, may then provide information related to the topic (e.g., a relevant advertisement) to the identified users, with a high probability that the information will be of interest to the users.

Figure 3:
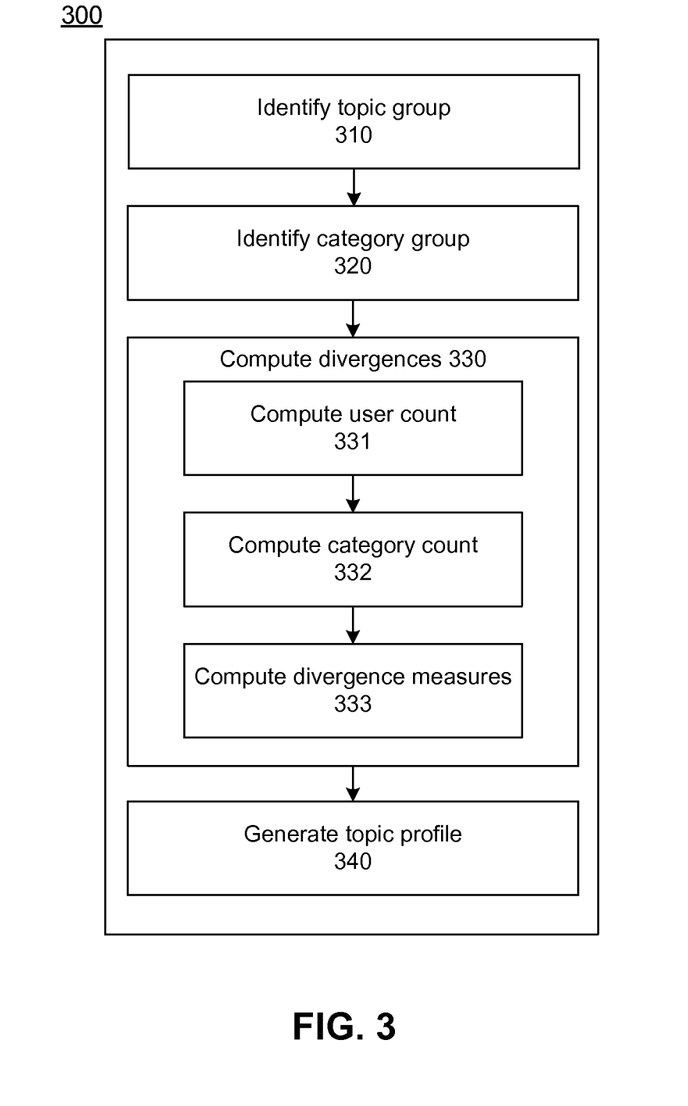
FIG. 3 is a flowchart illustrating the operations involved in forming the topic profiles 160 and identifying users similar to the topic group 150 using the topic profiles.

FIG. 3 is a flowchart illustrating the operations involved in forming the topic profiles 160 and identifying users similar to the topic group 150 using the topic profiles.

The group identification module 171 of the statistics module 125 identifies 310 a topic group 150 of users having an affinity for a given topic, and also identifies 320 a category group 155 of users having an affinity for a category that includes the topic and a plurality of other topics, as discussed above with respect to FIG. 1.

The divergence identification module 173 of the statistics module 125 computes 330 divergences between the topic group in the category group with respect to the candidate objects 130 according to the given criterion. More specifically, for each candidate object 130, the divergence identification module 173 uses the criterion evaluation module 172 to compute 331 a count of users of the topic group 150 that satisfy the criterion C(u, o), and to compute 332 a count of users of the category group 155 that satisfy that criterion, as discussed above with respect to FIG. 1. Using these counts, the divergence identification module 173 computes 333 a divergence measure for each candidate object 130, as discussed above with respect to FIG. 1.

The topic profile generation module 174 uses the computed divergence measures to generate 340 a topic profile 160 for the topic 140. The topic profile 160 is stored by the social networking system 100, and may be used to predict whether a given user will have an affinity for the topic 140, as discussed above with respect to the similar group identification module 175.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying a first topic group of users of a social networking system that have expressed an affinity for a page of the social networking system that corresponds to a first topic;
    determining, for a category, that the category includes the first topic and a plurality of other topics;
    identifying a category group of users of the social networking system that have expressed an affinity for a page corresponding to at least one of the topics included in the category;
    identifying a plurality of candidate pages of the social networking system, each candidate page having a corresponding candidate topic about which users of the first topic group and users of the category group can have differing opinions;
    for each candidate page of the plurality of candidate pages of a social networking system:
        computing a user interest measure quantifying an amount of interest expressed by users of the first topic group for the candidate topic corresponding to the candidate page,
        computing a category interest measure quantifying an amount of interest expressed by users of the category group for the candidate topic corresponding to the candidate page, and
        computing a divergence measure between the first topic group and the category group based on the user interest measure and the category interest measure;
    generating, for the first topic, a first topic profile based on the divergence measures; and storing the first topic profile.

2. The computer-implemented method of claim 1, further comprising:
    computing a first topic affinity score for a first user not in the first topic group by applying the topic profile to information of the social networking system about the first user; and
    predicting, based on the first topic affinity score, that the first user has an affinity for the first topic.

3. The computer-implemented method of claim 2, further comprising providing information associated with the first topic to the first user, responsive to predicting that the first user has an affinity for the first topic.

4. The computer-implemented method of claim 2, wherein the topic profile comprises identifiers of ones of the plurality of candidate pages and the corresponding divergence measures, and wherein computing the first topic affinity score comprises:
    computing, for each page in the profile, a value based on the divergence measure for the page and based on whether the first user has expressed an affinity for the page; and
    computing a sum of the values.

5. The computer-implemented method of claim 2, wherein the topic profile comprises identifiers of ones of the plurality of pages and the corresponding divergence measures, and wherein computing the first topic affinity score comprises computing a sum of products of divergence measures for the pages of the plurality of pages and whether the first user has expressed affinities for the pages.

6. The computer-implemented method of claim 1, wherein computing the divergence measure based on the user interest measure and the category interest measure comprises computing a ratio of the user interest measure and the category interest measure.

7. The computer-implemented method of claim 1, wherein the user interest measure is a count of users of the first topic group that have expressed an affinity for the topic corresponding to the page, and wherein the category interest measure is a category count of users of the category group that have expressed an affinity for the topic corresponding to the page.

8. A computer-implemented method comprising:
    identifying a topic group of users of a social networking system that have expressed an affinity for a first topic;
    identifying a category that includes the first topic and a plurality of other topics;
    identifying a category group of users that have expressed an affinity for the category;
    for each object of a plurality of candidate objects stored in an object store of the social networking system, and for a given criterion defined with respect to a specified user and a specified candidate object:
        computing a user interest measure of users of the topic group that together with the candidate object satisfy the criterion,
        computing a category interest measure of users of the category group that together with the candidate object satisfy the criterion, and
        computing a divergence measure based on the user interest measure and the category interest measure;
    generating, for the first topic, a topic profile based on the divergence measures; and storing the topic profile;
    wherein:
        the candidate objects comprise at least one of: users of the social networking system, pages of the social networking system, items of media of the social networking system, and groups of the social networking system, and the criterion comprises at least one of: whether the specified user has expressed an affinity for the specified candidate object, and whether the specified user is connected to the candidate object in a social graph of the social networking system.

9. The computer-implemented method of claim 8, further comprising:

computing a first topic affinity score for a first user not in the topic group by applying the topic profile to information of the social networking system about the first user; and predicting, based on the first topic affinity score, that the first user has an affinity for the first topic.

10. The computer-implemented method of claim 9, further comprising providing information associated with the first topic to the first user, responsive to predicting that the first user has an affinity for the first topic.

11. The computer-implemented method of claim 9, wherein the topic profile comprises identifiers of ones of the plurality of object and the corresponding divergence measures, and wherein computing the first topic affinity score comprises:

computing, for each object in the profile, a value based on the divergence measure for the object and based on whether the first user has expressed an affinity for the object; and computing a sum of the values.

12. The computer-implemented method of claim 8, wherein computing the divergence measure based on the user interest measure and the category interest measure comprises computing a ratio of the user interest measure and the category interest measure.

13. The computer-implemented method of claim 8, wherein the user interest measure is a count of users of the topic group that have expressed an affinity for the topic corresponding to the object, and wherein the category interest measure is a category count of users of the category group that have expressed an affinity for the topic corresponding to the object.

14. A non-transitory computer-readable storage medium comprising:

instructions for identifying a topic group of users of a social networking system that have expressed an affinity for a page of the social networking system that corresponds to a first topic;

instructions for identifying a category that includes the first topic and a plurality of other topics;

instructions for identifying a category group of users of the social networking system that have expressed an affinity for a page corresponding to at least one of the topics included in the category;

instructions for identifying a plurality of candidate pages of the social networking system, each candidate page having a corresponding candidate topic;

instructions for, for each candidate page of the plurality of pages of a social networking system computing a user interest measure quantifying an amount of interest expressed by users of the topic group in the topic corresponding to the candidate page, computing a category interest measure quantifying an amount of interest expressed by users of the category group in the topic corresponding to the candidate page, and computing a divergence measure based on the user interest measure and the category interest measure;

instructions for generating, for the first topic, a topic profile based on the divergence measures; and instructions for storing the topic profile.

15. The non-transitory computer-readable storage medium of claim 14, further comprising:

instructions for computing a first topic affinity score for a first user not in the topic group by applying the topic profile to information of the social networking system about the first user; and instructions for predicting, based on the first topic affinity score, that the first user has an affinity for the first topic.

16. The non-transitory computer-readable storage medium of claim 15, wherein the topic profile comprises identifiers of ones of the plurality of pages and the corresponding divergence measures, and wherein computing the first topic affinity score comprises:

computing, for each page in the profile, a value based on the divergence measure for the page and based on whether the first user has expressed an affinity for the page; and computing a sum of the values.

17. A computer system comprising:

a processor; and a non-transitory computer-readable medium storing instructions executable by the processor, the instructions comprising:

instructions for identifying a first topic group of users of a social networking system that have expressed an affinity for a page of the social networking system that corresponds to a first topic;

instructions for determining, for a category, that the category includes the first topic and a plurality of other topics;

instructions for identifying a category group of users of the social networking system that have expressed an affinity for a page corresponding to at least one of the topics included in the category;

instructions for identifying a plurality of candidate pages of the social networking system, each candidate page having a corresponding candidate topic about which users of the first topic group and users of the category group can have differing opinions;

instructions for, for each candidate page of the plurality of candidate pages of a social networking system:

computing a user interest measure quantifying an amount of interest expressed by users of the first topic group for the candidate topic corresponding to the candidate page, computing a category interest measure quantifying an amount of interest expressed by users of the category group for the candidate topic corresponding to the candidate page, and computing a divergence measure between the first topic group and the category group based on the user interest measure and the category interest measure;

instructions for generating, for the first topic, a first topic profile based on the divergence measures; and instructions for storing the first topic profile.

18. The computer system of claim 17, the instructions further comprising:

instructions for computing a first topic affinity score for a first user not in the first topic group by applying the topic profile to information of the social networking system about the first user; and instructions for predicting, based on the first topic affinity score, that the first user has an affinity for the first topic.

19. The computer system of claim 18, the instructions further comprising instructions for providing information associated with the first topic to the first user, responsive to predicting that the first user has an affinity for the first topic.

20. The computer system of claim 18, wherein the topic profile comprises identifiers of ones of the plurality of candidate pages and the corresponding divergence measures, and wherein computing the first topic affinity score comprises:
   computing, for each page in the profile, a value based on the divergence measure for the page and based on whether the first user has expressed an affinity for the page; and
   computing a sum of the values.

* * * * *